US008410975B1

(12) United States Patent
Bell et al.

(10) Patent No.: US 8,410,975 B1
(45) Date of Patent: Apr. 2, 2013

(54) SYSTEMS AND METHODS FOR GENERATING AND VERIFYING ALTITUDE DATA

(75) Inventors: Douglas A. Bell, Marion, IA (US);
Richard D. Jinkins, Rewey, WI (US);
Sarah Barber, Cedar Rapids, IA (US);
Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/892,546

(22) Filed: Sep. 28, 2010

(51) Int. Cl.
*G01S 13/08* (2006.01)
(52) U.S. Cl. ........................................ 342/120; 342/175
(58) Field of Classification Search ........... 342/118–146
See application file for complete search history.

(56) References Cited

U.S. PATENT DOCUMENTS

| 3,177,484 A * | 4/1965 | Case, Jr. et al. | 342/33 |
| 6,094,607 A * | 7/2000 | Diesel | 701/4 |
| 7,619,556 B1 | 11/2009 | McCusker | |
| 2002/0126041 A1 * | 9/2002 | Hedrick | 342/120 |
| 2009/0189787 A1 * | 7/2009 | Khatwa | 340/970 |
| 2009/0315755 A1 * | 12/2009 | Cornic et al. | 342/38 |

FOREIGN PATENT DOCUMENTS

WO WO 2007131923 A1 * 11/2007

* cited by examiner

*Primary Examiner* — Timothy A Brainard
(74) *Attorney, Agent, or Firm* — Donna P. Suchy; Daniel M. Barbieri

(57) ABSTRACT

Present novel and non-trivial systems and methods for altitude data from a radar system and employing such data to verify altitude data from another source. A processor receives reflection point data generated by an aircraft radar system and reference point data from an applicable data source. Based upon the reflection point data and reference point data, first altitude data representative of a first measurement of aircraft altitude is generated. Then, the processor receives second altitude data representative of a second measurement of aircraft altitude from another source. Validity of the second altitude data may be determined by comparing it with the first data, after which validity advisory data may be generated that, is responsive to the validity determination. Then, the processor may provide the validity advisory data to a presentation system, whereby validity information of the second altitude data is presented to the pilot.

24 Claims, 6 Drawing Sheets

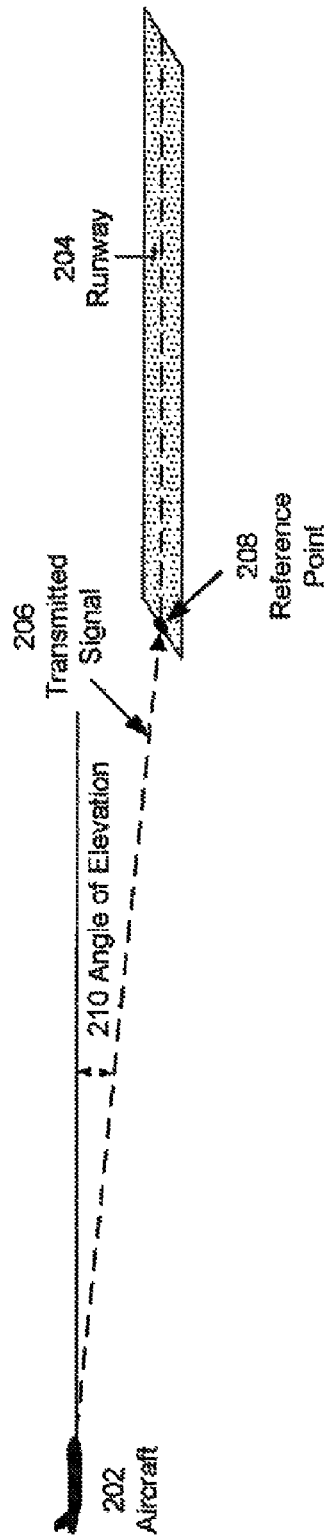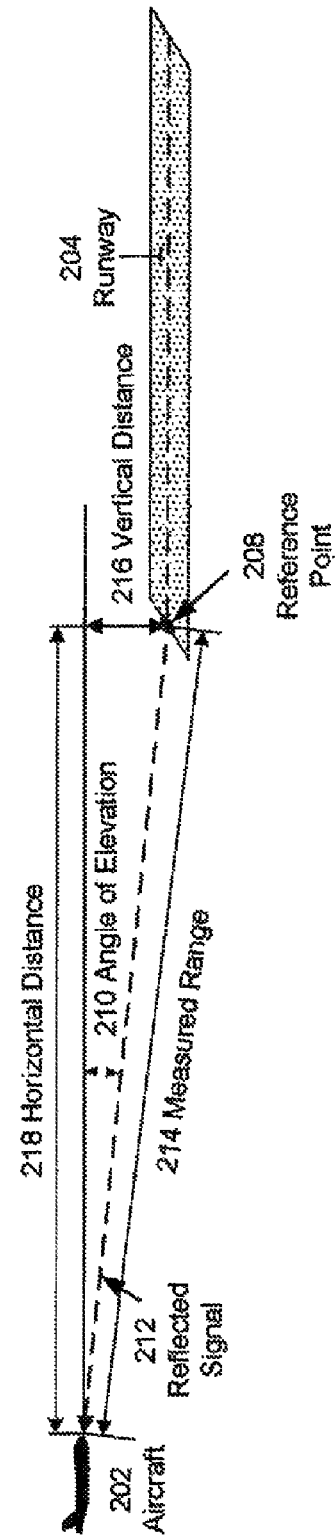
FIG. 2A
FIG. 2B

SYSTEMS AND METHODS FOR GENERATING AND VERIFYING ALTITUDE DATA

BACKGROUND OF THE INVENTION

1. Field of the Invention

This invention pertains generally to the field of aircraft altimeter systems.

2. Description of the Related Art

The continuing growth of aviation has placed increasing demands on airspace capacity and emphasizes the need for the best use of the available airspace. These factors, along with the accuracy of modern aviation navigation systems and the requirement for increased operational efficiency in terms of direct routings and track-keeping accuracy, have resulted in the concept of "Required Navigation Performance" ("RNP") standards—statements of the navigation performance accuracy necessary for operation within a defined airspace. Some of these standards appear in an Advisory Circular ("AC") published by the Federal Aviation Administration ("FAA") and in a Document ("DO") published by the Radio Technical Commission for Aeronautics ("RTCA"). For example, the FAA has published AC 120-29A entitled "Criteria for Approval of Category I and Category II Weather Minima for Approach," and the RCTA has published DO-236B entitled "Minimum Aviation System Performance Standards: Required Navigation Performance for Area Navigation."

RNP may include performance and functional requirements indicated by the RNP type. The RNP type defines the total system error ("TSE") that may be allowed in lateral and longitudinal dimensions within a particular airspace, where the TSE takes into account path definition errors ("PDE"), navigation system errors ("NSE"), and flight technical errors ("FTE"). The RNP type is used to specify navigation requirements for the airspace or a navigation system that provides a specified level of accuracy defined by a lateral area of confined airspace in which an RNP-certified aircraft operates. For example, an RNP 0.3 level requires a normal navigational accuracy of 0.3 nautical miles ("NM") at least 95 percent of the total flight time; similarly, an RNP 0.01 level requires the a normal navigational accuracy of 0.01 NM at least 95 percent of the total flight time. Hence, a lower level of RNP means a greater level of navigational accuracy.

One way to achieve a greater level of navigational accuracy is to reduce the TSE. Because the TSE may be comprised of the PDE, NSE, and FTE, a reduction of any of these—such as the NSE—could reduce the TSE which, in turn, could produce a greater level of navigational accuracy. A reduction of NSE could be obtained by monitoring and/or augmenting altitude data provided by one or more navigation systems with an independent source of altitude data. Such independent source could be used to generate altitude data and validate the navigation system altitude data by confirming the navigation system altitude data falls within lower desired tolerances commensurate with a lower NSE.

BRIEF SUMMARY OF THE INVENTION

The embodiments disclosed herein present novel and nontrivial systems and methods for generating altitude and verifying altitude data. The employment of such systems and methods may be used to generate an independent source of altitude data and to use this data to verify a second source of altitude information.

In one embodiment, a system is disclosed for generating altitude data. The system could be comprised of an aircraft radar system for generating and providing reflection point data, a source for providing reference point data, and a processor. The reference point could be a landing threshold point and/or the reflection point could coincide with the reference point. The reflection point data may be representative of elevation angle and a range to a reflection point as measured by the aircraft radar system. Alternatively, the reflection point data may be representative of a vertical distance above the reflection point, where such vertical distance has been determined from an elevation angle and a range to a reflection point as measured by the aircraft radar system.

After receiving the reflection point data and the reference point data, the processor may generate altitude data representative of a first measurement of aircraft altitude, where such altitude data is based upon the reflection point data and the reference point data. The altitude data could also be based upon elevation offset data representative of a difference in elevation between the reflection point and reference point. In additional embodiments of the system, the system could include a navigation data source for providing second altitude data to the processor and/or a presentation system. After receiving such navigation data, the processor may determine the validity of the second altitude data and provide such validity data to a presentation system as discussed in the following paragraph.

In another embodiment, a system is disclosed for verifying altitude data. The system could be comprised of a source of radar-based altitude data for providing first altitude data, a source of navigation data for providing second altitude data, and a processor. After receiving the first and second altitude data representative of first and second measurements of aircraft altitude, respectively, the processor could determine the validity of the second altitude data and generate validity advisory data responsive to the validity determination and representative of validity information. The second altitude data could be determined to be valid when the difference between the two measurements falls within a defined tolerance level.

In an additional embodiment of the system, a presentation system could be included for receiving the validity advisory data from the processor. The presentation system could be comprised of a display unit, an aural alert unit, and/or a tactile alert unit for presenting validity information to the pilot via a display unit, an aural alert unit, and/or a tactile unit, respectively.

In another embodiment, a method is disclosed for generating altitude data. The method could be comprised of receiving reflection point data from a radar system, reference point data from an applicable data source, and generating first altitude data representative of a first measurement of altitude data. In an additional embodiment of the method, the method could include receiving second altitude data from a navigation data source, determining the validity of the second altitude data, generating validity advisory data, and providing the validity advisory data to a presentation system as discussed in the following paragraph.

In another embodiment, a method is disclosed for verifying altitude data. The method could be comprised of receiving first altitude data from a source of radar-based data, receiving second altitude data from a source of navigation data, determining the validity of the second altitude data, and generating validity advisory data responsive to the validity determination and representative of validity information. Additionally, the method could include providing the validity advisory data to a presentation system, wherein such system subsequently presents the validity information to the pilot via a display unit, an aural alert unit, and/or a tactile unit.

BRIEF DESCRIPTION OF THE DRAWINGS

The drawings of FIG. 1 depict a combined functional block diagram of altimeter systems for generating and verifying altitude data.

The drawings of FIG. 2 depict a forward-looking radar system.

The drawings of FIG. 4 depict the measurement of vertical distance of aircraft altitude by the aircraft radar system.

Figure 5:
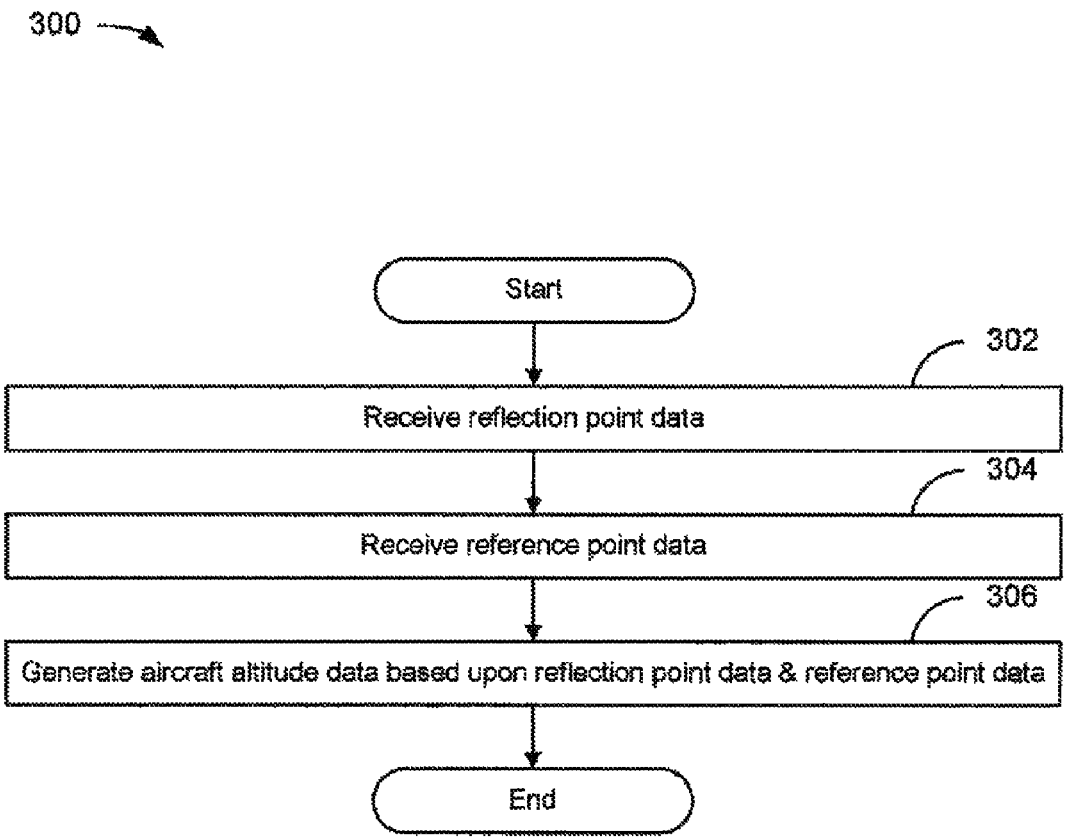

FIG. 5 depicts a flowchart of a, method for generating altitude data.

Figure 6:
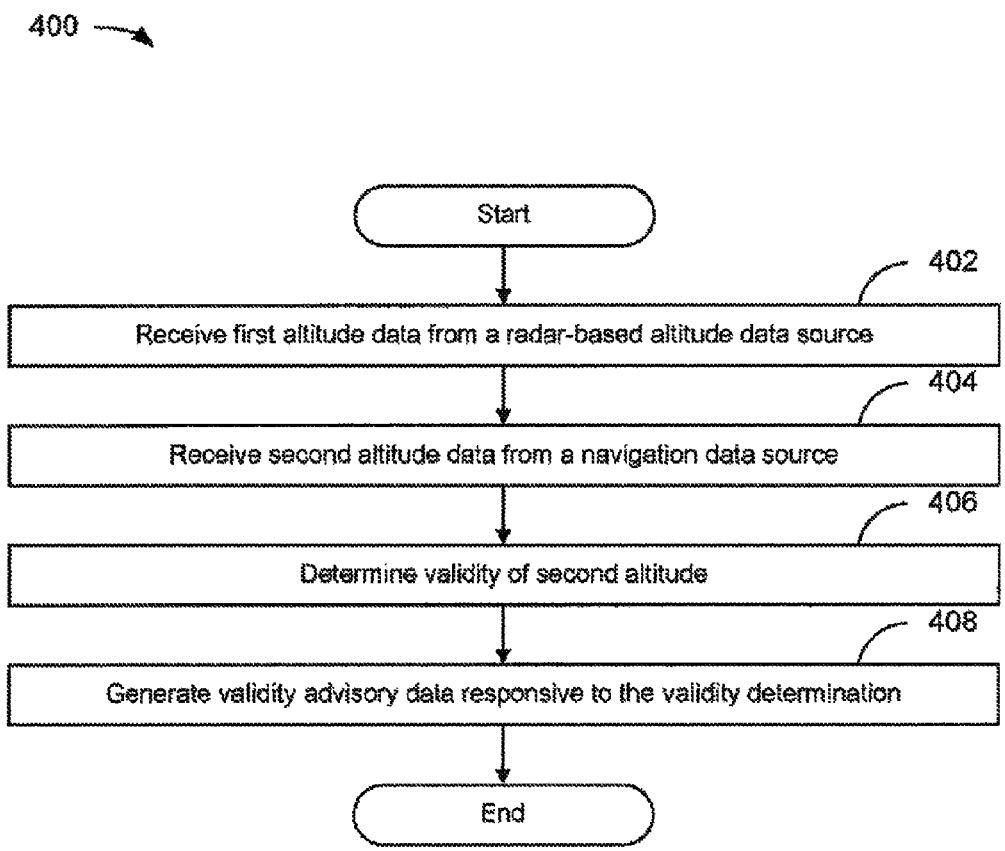

FIG. 6 depicts a flowchart of a method for generating altitude data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
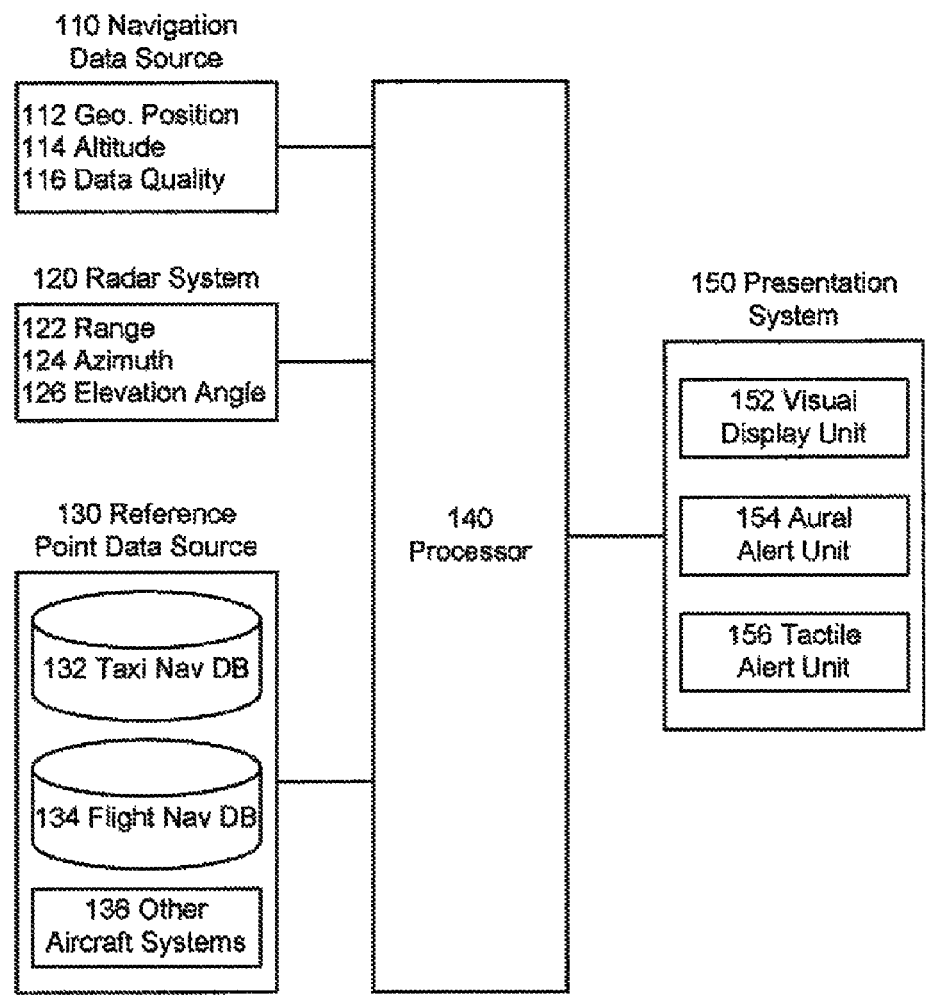

FIG. 1 depicts a functional block diagram of an altitude data generation and verification system 100 suitable for implementation of the techniques described herein. The functional blocks of the system may include a navigation data source 110, an aircraft radar system 120, a reference point data source 130, a processor 140, and a presentation system 150.

In an embodiment of FIG. 1, the navigation data source 110 is comprised of one or more systems that could provide navigation information in an aircraft. It should be noted that data, as embodied herein for any source or system in an aircraft including a navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), a global navigation satellite system (or satellite navigation system), and a flight management computing system ("FMS"), all of which are known to those skilled in the art. As embodied herein, the navigation data source 110 could provide navigation data including, but not limited to, geographic position 112 (e.g., latitude and longitude coordinates) and altitude 114. As embodied herein, aircraft position comprises geographic position 112 and altitude 114, and direction may be derived from either geographic position 112, aircraft position, or both. Navigation data quality 116 may include parameters associated with, but not limited to, accuracy, resolution, integrity, uncertainty, and/or validity for data provided by a navigation system 110. Those skilled in the art understand that quality of navigation data could depend on the system providing the data, e.g., an air/data system, an attitude heading reference system, an inertial guidance system (or inertial reference system), a global navigation satellite system (or satellite navigation system), and a flight management computing system. Furthermore, the quality of navigation data provided by a system could depend on other considerations.

For example, a global navigation satellite system could depend on whether a system is employed to augment satellite signals. A Satellite-Based Augmentation System ("SBAS") such as the wide area augmentation system ("WAAS") employed by the United States Federal Aviation Administration ("FAA") may deliver an increase of quality of data through such parameters as accuracy, availability, and integrity; a WAAS broadcast message may improve signal accuracy from 100 meters to approximately 7 meters. A Ground-Based Augmentation System ("GBAS") such as the local area augmentation system ("LAAS") employed by the FAA may deliver an even better quality of data than a WAAS by providing extremely high parameters of accuracy, availability, and integrity; for example, a LAAS has demonstrated an accuracy of less than 1 meter in both the horizontal and vertical axes. As embodied herein, the navigation data source 110 could provide navigation data to the processor 140 for subsequent processing as discussed herein.

In an embodiment of FIG. 1, the aircraft radar system 120 could comprise any aircraft radar system installed in an aircraft which provides range data corresponding to one or more, reference points located outside of the aircraft. The aircraft radar system 120 is well-known to those skilled in the art. A common example of the aircraft radar system 120 is a forward-looking aircraft weather radar system. The aircraft radar system 120 may be comprised of, in part, a transceiver and antenna. A transceiver may transmit electromagnetic waves into the atmosphere via an antenna which, in turn, produces a focused beam. The transceiver may control the direction of the beam by steering the antenna horizontally and vertically.

When the waves strike or reflect Off an object such as terrain or a runway surface, part of the energy in the waves is reflected back and' received by the antenna. The range 122 of the object may be determined by the transceiver by measuring the elapsed time between the transmission and reception of the signal. The azimuth 124 of the object may be determined as the angle to which the antenna was steered in the horizontal direction relative to the longitudinal axis of the aircraft during the transmission/reception of the signal. The elevation or elevation angle 126 of the object may be determined as the angle to which the antenna was steered in the vertical direction relative to the longitudinal axis of the aircraft during the transmission/reception of the signal. As embodied herein, a forward-looking aircraft radar system 120 could acquire terrain data including, but not limited to, range 122, azimuth 124, and elevation angle 126.

As embodied herein, the aircraft radar system 120 may be used in the generation of altitude data by determining a measurement of vertical distance. Referring to the drawings of FIG. 2, a forward-looking aircraft radar system is installed in aircraft 202 flying towards a runway 204. As indicated by the transmitted signal 206 in FIG. 2A, the radar system has transmitted a signal via an antenna in the direction of a reference point 208, where the transmitted signal has been directed downward at an angle of elevation 210 with respect to a reference axis (which is assumed to coincide with the longitudinal axis of the aircraft 202).

When a signal strikes or reflects off the reference point 208 as shown in FIG. 2B, part of the energy in the signal is reflected back as indicated by the reflected signal 212. When the reflected signal 212 is received by the antenna, a measured range 214 may be determined. Then, the vertical distance 216 between the aircraft 202 and the reference point 208 may be determined using the measured range 214 and the angle of elevation 210 between the aircraft 202 and the reference point 208. Then, the altitude of the aircraft 202 may be determined by adding the vertical distance 216 to the known elevation of the reference point 208.

It should be noted that the reference point 208 coincides with a landing threshold point ("LTP") of the runway 204. Generally, the LTP of a runway may be the point where the runway centerline intersects the runway threshold of a runway, where the LTP has a defined geographic position and elevation. Data representative of the geographic position and elevation of the LTP may be stored in the reference point data source 130. Although the reference points in the following discussion may be drawn to LTPs, the disclosures herein are not limited to LTPs but may include any point having a defined geographic position and elevation.

As discussed above, the quality of navigation data provided by the navigation data source 110 may depend upon one or more quality parameters such as, but not limited to, accuracy, resolution, integrity, uncertainty, and/or validity. Due to the quality of navigation data, there could be a difference between the aircraft, position information represented in the navigation data and the actual position of the aircraft. For example, the altitude information provided by a global navigation satellite system may not agree with the actual altitude of the aircraft.

Additionally, the quality of navigation data between navigation data source systems could differ. For example, the barometric altitude information provided by an air/data system may not agree with altitude information provided by a global navigation satellite system; moreover, each of these may not agree with the actual altitude of the aircraft. In order to verify the altitude information provided by one or more navigation data source systems, the aircraft radar system 120 may be used to determine the altitude of an aircraft. As embodied herein, the radar data system 120 could provide data representative of a horizontally-displaced point to the processor 140 for subsequent processing as discussed in detail below.

Returning to FIG. 1, the reference point data source 130 could comprise any source of reference point data including, but not limited to, data representative of locations and/or delimitations of markings. The reference data source 130 may include, but is not limited to, a taxi navigation database 132, a flight navigation database 134, and other aircraft systems 136. It should be noted that data contained in any database discussed herein may be stored in a digital memory storage device or computer-readable media including, but not limited to, RAM, ROM, CD, DVD, hard disk drive, diskette, solid-state memory, PCMCIA or PC. Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

The taxi navigation database 132, such as one described by Krenz et al in U.S. Pat. No. 7,974,773, may be used to store airport data that may be representative of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 132 could comprise an aerodrome mapping database ("AMDB") as described in the following document published by RTCA, Incorporated: RICA DO-272A entitled "User Requirements for Aerodrome Mapping Information." DO-272A provides for aerodrome surface mapping requirements for aeronautical uses particularly onboard aircraft. Those skilled in the art appreciate that these standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB.

The flight navigation database 134 may contain records which provide reference data such as, but not limited to, runway data, airport data, and/or approach data. The flight navigation database 134 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and GNSS Landing Systems. Such flight navigation database 134 could be provided by an aircraft system such as, but not limited to, an FMS, a system known to those skilled in the art.

Other aircraft systems 136 could comprise a source of reference data and are included herein as a source of reference point data. As embodied, herein, the reference point data source 130 could provide reference point data to the processor 140 for subsequent processing as discussed herein.

In an embodiment of FIG. 1, the processor 140 may be any electronic data processing unit which executes software or computer instruction code that could, be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processor 140 may be driven by the execution of software or computer instruction code containing algorithms developed for the specific functions embodied herein. The processor 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the processor 140 could be a processor(s) used by or in conjunction with any other system of the aircraft including, but not limited to, the navigation data source 110, the radar system 120, the reference point data source 130, and the presentation system 150, or any combination thereof.

The processor 140 may be programmed or configured to receive as input data representative of information obtained from various systems and/or sources including, but not limited to, the navigation data source 110, the radar system 120, and the reference point data source 130. As embodied herein, the terms "programmed" and "configured" are synonymous. The processor 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processor 140 may be programmed or configured to execute one or both of the methods discussed in detail below. The processor 140 may be programmed or configured to provide output data to various systems and/or units including, but not limited to, the presentation system 150.

In an embodiment of FIG. 1, the presentation system 150 could be comprised of any presentation unit used for presenting visual, aural, and/or tactile indications regarding validity advisory information including, but not limited to, a visual display unit 152, an aural alerting unit 154, and/or a tactile alerting unit 156. As embodied herein, the visual display unit 152 may include a vision system (not shown) which generates an image data set which represents the image displayed on a display unit. Vision systems could include, but are not limited to, a synthetic vision system ("SVS"), an enhanced vision system ("EVS"), or a combined SVS-EVS, or combination thereof.

The visual display unit 152 could be a Head-Down Display ("HDD") unit and/or a Head-Up Display ("HUD") unit. An HDD unit is typically a unit for providing flight information to the pilot that is mounted to an aircraft's flight instrument panel located in front of a pilot and below the windshield and the pilot's external field of vision. A HUD unit is mounted in front of the pilot at windshield level and is directly in the pilot's external field of vision. The HUD system is advantageous because the display is transparent allowing the pilot to keep his or her eyes "outside the cockpit" while the display unit provides flight information to the pilot.

Figure 3A:
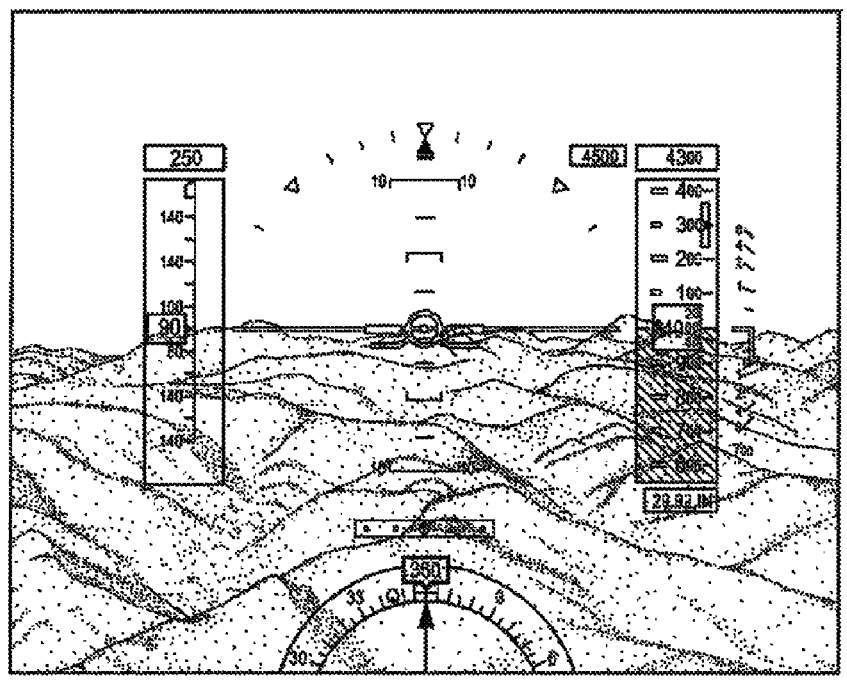
FIG. 3A depicts an exemplary illustration of an image on an HDD display unit depicting a scene outside the aircraft with symbology providing flight information.

FIG. 3A provides an exemplary depiction of an HDD unit for presenting information to the pilot or flight crew against the background of a three-dimensional image of terrain and, sky; the HDD unit could be employed as a display unit in an SVS, an EVS, or a ESVS. It should be noted that the information depicted on the HDD unit has been made minimal for the sake of presentation and is not indicative of the plurality of indications or information with which it may be configured. Because the indications or information shown in FIG. 3A (and FIG. 3B) are well-known to those skilled in the art, a discussion of the specific information shown is not provided herein.

Figure 3B:
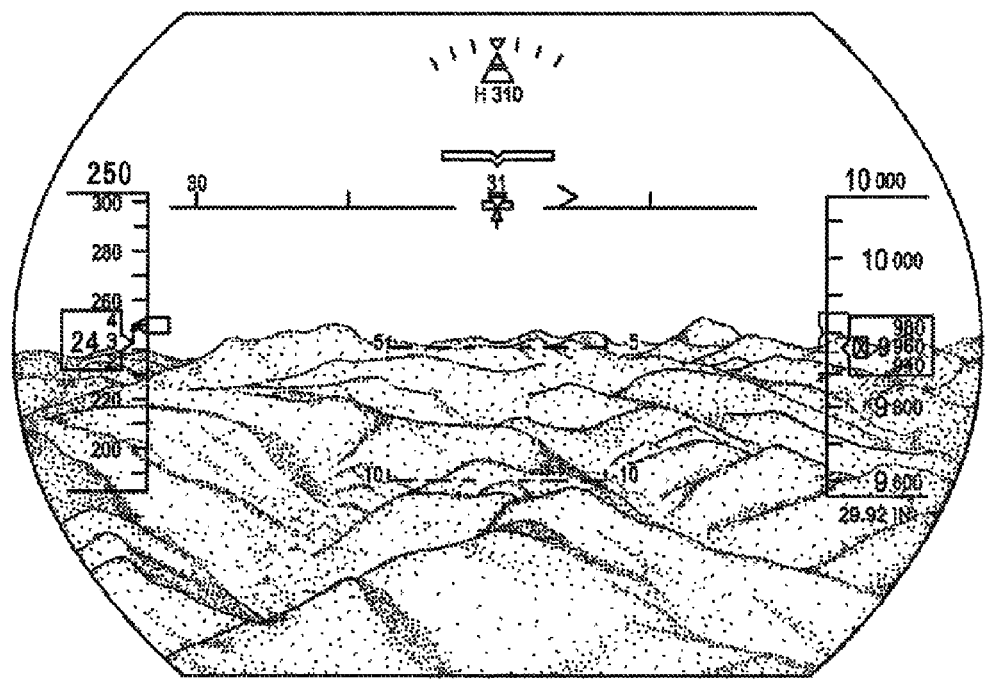
FIG. 3B depicts an exemplary illustration of an image on a HUD display unit depicting a scene outside the aircraft with symbology providing flight information.

FIG. 3B provides an exemplary depiction of a HUD unit for presenting information to the pilot or flight crew against the background of a three-dimensional image of terrain and sky; a HUD unit could be employed as display unit in an SVS, an EVS, or a ESVS. It should be noted that the information depicted on the HUD unit has been made minimal for the sake of presentation and is not indicative of the plurality of indications or information with which it may be configured.

Returning to FIG. 1, the visual display unit 152 could be capable of presenting validity information regarding altitude data by displaying or projecting such information on the screen of the visual data unit 152. Validity information may include alerts and/or non-alert(s). Alerts may be based on level of threat or conditions requiring immediate crew awareness. Caution alerts may be alerts requiring immediate crew awareness and subsequent flight crew response. Warning alerts may be alerts requiring immediate flight crew action. As embodied herein, both caution and warning alerts may be presented in combination with or simultaneous to aural alerts and/or tactile alerts. Alerts may be presented visually by depicting one or more colors that may be presented on a display unit indicating one or more levels of threat. For the purpose of illustration and not limitation, amber or yellow may indicate a caution alert, and red may indicate a warning alert; green, white, or cyan may indicate information that is not an alert.

In one embodiment, visual alerts could be presented in a textual form including text messages such as a red "CHK FAIL" when the conditions for a warning alert have been met. In another embodiment, visual alerts could be presented in a non-textual form such as a symbol. In another embodiment, textual and non-textual forms could remain steady or flash intermittently, where the speed of such flashing could depend on the distance to a runway.

It should be noted that the disclosure herein will discuss visual alerts which present a textual form with a plurality of words included. As used herein, the words should be construed as generic words for advisory information provided to the pilot and not words which limit the presentation to the recipient. For the purpose of illustration and not limitation, a non-exhaustive list of words that may be used (where such words may depend on the conditions experienced by an aircraft either on the ground or in flight) could include, but are limited to, "CHK FAIL" or "NOT VALID" when a determination of validity is not favorable, "ALT MON" or "VALID" when a determination of validity is favorable, or "RWY CHK" or "VALID TBD" when waiting for the result of a validity determination.

The aural alerting unit 154 may be any unit capable of producing aural alerts. Aural alerts may be discrete sounds, tones, and/or verbal statements used to annunciate a condition, situation, or event. In one embodiment, an aural alert could call out "WARNING—ALTITUDE VALIDITY NOT CONFIRMED" when the conditions for a warning alert have been met, a tonal indicator could be provided, or both. As embodied herein, warning and caution aural alerts could be presented in combination with or simultaneous to visual alerts and/or tactile alerts.

In an embodiment of FIG. 1, a tactile alerting unit 156 may be any unit capable of producing tactile alerts. Tactile alerts may be any tactile stimulus to present a condition, situation, or event to the pilot. As embodied herein, tactile alerts could be presented in combination with or simultaneous to visual alerts and/or aural alerts.

Figure 4A:
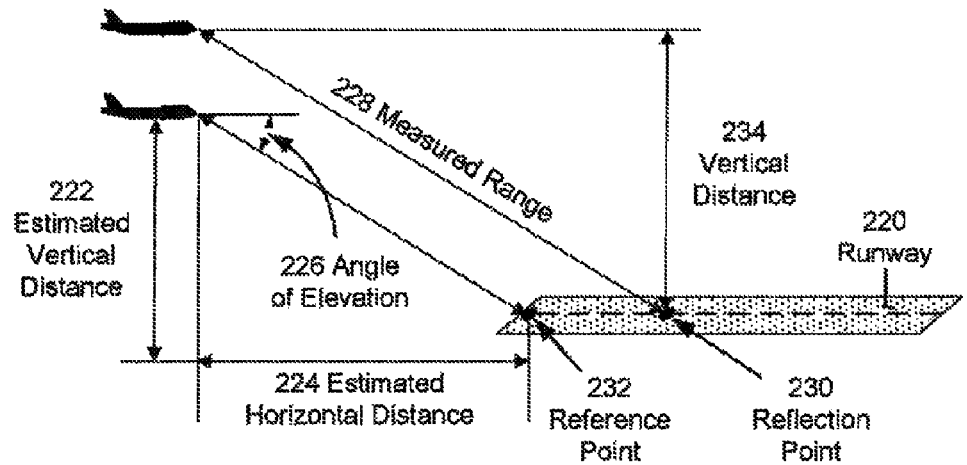

The advantages and benefits of the embodiments disclosed herein may be illustrated by showing how a value of aircraft altitude may be measured by the aircraft radar system 120. Referring to FIG. 4A, an aircraft configured with art aircraft radar system and approaching a runway 220 is drawn twice; the upper aircraft represents the aircraft flying at its actual position, and the lower aircraft represents the aircraft flying at its navigation source-referenced position.

As discussed above, navigation data representative of aircraft position comprised of geographic position 112 and altitude 114 may be provided by the navigation data source 110, and data representative of a reference point comprised of geographic position and elevation may be provided by the reference point data source 130. Referring to the lower aircraft shown in FIG. 4, an estimated vertical distance 222 may be found as the difference between the altitude 114 and the elevation, and an estimated horizontal distance 224 may be found as difference between the two geographic, positions. Then, an angle of elevation 226 may be found as an arctangent function of the estimated vertical distance 222 and the estimated horizontal distance 224.

With this angle of elevation, a radar signal may be transmitted via an antenna in the direction of the reference point at this angle of elevation 226 as shown by the upper aircraft. Because the actual aircraft position has been, assumed to be higher than the aircraft position represented in the navigation data; a measured range 228 will be determined from the signal reflected off a reflection point 230 which is further away from the aircraft than the reference point 232. Assuming the difference in elevation between the reference point 232 and the reflection point 230 is negligible, the elevation of the reflection point may be assumed to be the elevation of the reference point. Then, a vertical distance 234 may be found as the product of the measured range 228 and a sine function of the angle of elevation 226. After the vertical distance 234 is found, a measurement of aircraft altitude may be found as the sum of the assumed elevation and the vertical distance 234. Thereafter, this measurement of aircraft altitude may be used to verify the measurement of aircraft altitude 114 provided by the navigation data source 110.

Figure 4B:
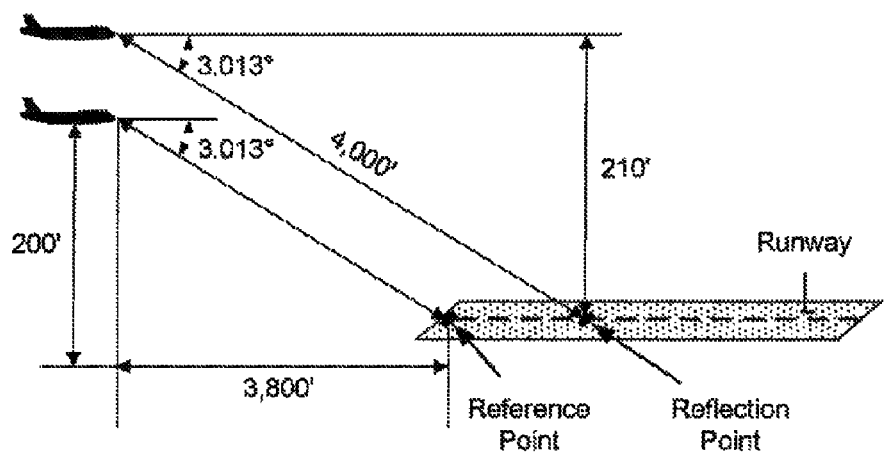

Referring to FIG. 4B, assume that the measurement of aircraft altitude represented in the navigation data is equal to 900 feet mean sea level ("MSL") and that the elevation of the reference point represented in reference point data is 700 feet MSL; as such, an estimated vertical distance is found to be 200 feet above ground level ("AGL"). Now, assume that the estimated horizontal distance has been found to be equal to 3,800 feet from the navigation data and reference point data. Applying an arctangent function to the quotient of 200 feet and 3,800 feet, the angle of elevation is found to be 3.013 degrees.

Assume that a radar signal is transmitted downward at 3.013 degrees via an antenna in the direction of the reference point, and that the measured range to the reflection point is found to be equal to 4,000 feet after the reflection of the signal is received by the aircraft radar system 120. With these values, the vertical distance is found to be approximately equal to 210 feet AGL from the product of 4,000 feet and the sine of 3.013 degrees. Because the difference in elevation between the reflection point and the reference point has been assumed to be negligible, a measurement of aircraft altitude is found to equal 910 feet MSL from the sum of 210 feet AGL and 700 feet MSL.

It should be noted that, although the difference in elevation between the reference point and the reflection point has been treated as negligible, changes in surface gradient between the reference point and the reflection point may be included as an elevation offset. In one embodiment, the runway gradient information stored in the reference point data source 130 may be applied to the distance between the reference point and the reflection point, where such distance may be determined by the difference between the horizontal distance between the aircraft and the reflection point (as a function of the measured range and the cosine of the angle of elevation) and the estimated horizontal distance between the aircraft and the reference point. In another embodiment, a default value of the runway gradient could be defined and employed by a manufacturer and/or end-user, and applied to the distance between the reference point and reflection point. In another embodiment, a value of the runway gradient could be estimated by determining the rise over run between the opposing LTPs of the same runway surface, where the rise and the run may be determined using the differences in elevation and the differences in geographic position between the opposing LTPs, respectively. The resulting estimation could then be applied to the distance between the reference point and reflection point.

The measurement of aircraft altitude of 900 feet MSL represented in the navigation data does not equal the measurement of aircraft altitude of 910 feet MSL determined by the aircraft radar system 120; despite the inequality, however, the altitude data represented in the navigation data may nevertheless be valid if a tolerance limit is employed. For example, if a tolerance limit between the two values of altitude has been defined as +/−11 feet, then the measurement of aircraft altitude represented in the navigation data could be determined to be valid because the actual difference of 10 feet falls within the defined tolerance limit; on the other hand, if the tolerance limit has been defined as +/−9 feet, then the measurement of aircraft altitude represented in the navigation data could be determined to be not valid because the actual difference of 10 feet falls outside of the defined tolerance limit.

FIG. 5 depicts flowchart 300 disclosing an example of a method for generating altitude data, and FIG. 6 depicts flowchart 400 disclosing an example of a method for determining the validity of altitude data, where the processor 140 may be programmed or configured with instructions corresponding to the following modules embodied in flowcharts 300 and 400. As embodied herein, the processor 140 may be a processor or a combination of processors found in the navigation data source 110, the aircraft radar system 120, the reference point data source 130, the processor 140, and/or the presentation system 150. Also, the processor 140 may be a processor of a module such as, but not limited to, a printed circuit card having one or more input interfaces to facilitate the two-way data communications of the processor 140, i.e., the receiving and providing of data. As necessary for the accomplishment of the following modules embodied in flowcharts 300 and 400, the receiving of data is synonymous and/or interchangeable with the retrieving of data, and the providing of data is synonymous and/or interchangeable with the making available or supplying of data.

As shown in FIG. 5, the flowchart 300 is depicted. The flowchart begins with module 302 with the receiving of reflection point data that may be provided by the aircraft radar system 120, where such system may have generated the reflection point data of a reflection point that is horizontally displaced from the aircraft and provided such data to the processor 140. In one embodiment, the reflection point data may be data representative of a vertical distance above the reflection point as previously determined by the aircraft radar system 120, where the aircraft radar system 120 could have determined the vertical distance as a function of a range and an elevation angle to the reflection point as discussed above. In another embodiment, the reflection point data may be data representative of the measured range and the elevation angle to the reflection point as generated by the aircraft radar system 120; if so, the processor 140 could determine the vertical distance as a function of a range and an elevation angle to the reflection point. In another embodiment, an elevation offset could be applied as discussed above.

As embodied herein, the reference point may be any point having a defined geographic position and elevation such as, but not limited to, an LTP. Also, if the actual aircraft position agrees with the aircraft position represented in navigation source data, then the reference point will coincide with the reflection point.

The flowchart continues with module 304 with the receiving of reference point data that may be provided by the reference point data source 130. As embodied herein, the reference point data may be representative of the elevation of the reference point.

The flowchart continues with module 306 with the generating of aircraft altitude based upon the reflection point data and reference point data, where such altitude data is representative of a first measurement of altitude data, where the basis for generating the aircraft altitude could include data representative of an elevation offset representative of a difference in elevation between the reflection point and the reference point. As one embodiment herein, the first measurement of aircraft altitude may be determined by adding the vertical distance to the elevation. In another embodiment, second altitude data representative of a second measurement of aircraft altitude may be provided to the processor 140 by the navigation data source 110; if so, then the first altitude data and the second altitude data may be subjected to a validity determination as disclosed in flowchart 400. Then, flowchart 300 proceeds to the end.

As shown in FIG. 6, the flowchart 400 is depicted. The flowchart begins with module 402 with the receiving of first altitude data that may be provided by a source of radar-based altitude data. In one embodiment, the first altitude data could be representative of a first measurement of aircraft altitude. In another embodiment, the source of the radar-based altitude data could be a second processor 140 performing the method disclosed in flowchart 300.

The flowchart continues with module 404 with the receiving of second altitude data that may be provided by the navigation data source 110. As embodied herein, the second altitude data could be representative of a second measurement of aircraft altitude.

The flowchart continues with module 406 with the determining of the validity of the second altitude data by comparing the first, altitude data with the second altitude data. As embodied herein, the validity, of the second altitude data may be determined using a defined tolerance limit, where valid second altitude data may exist when the difference between the first measurement of aircraft altitude and the second measurement of aircraft altitude falls within the defined tolerance limit.

The flowchart continues with module 408 with the generating of validity advisory data representative in response to the validity determination; where the validity advisory data may be representative of validity information corresponding to the validity determination, and the validity information may be representative of visual information, aural information, tactile, information, or any combination thereof as configured by a manufacturer and/or end-user. In one embodiment, the validity advisory data may be provided to the presentation system 150. If the second altitude data has been determined to be valid, then validity information indicative of the favorable determination may be presented to the pilot on the applicable presentation unit(s); likewise, if the second altitude data has been determined to be not valid, then validity information indicative of the unfavorable determination may be presented to the pilot on the applicable presentation unit(s). Then, flowchart 400 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating altitude data, such system comprising:
   an aircraft radar system;
   a source of reference point data; and
   a first processor configured to
      receive reflection point data corresponding to a reflection point from the aircraft radar system other than a radar altimeter system,
      receive reference point data representative of the fixed elevation of a fixed surface reference point, where
         the fixed elevation of the fixed surface reference point is a measurement of vertical distance between the surface and a conventional, fixed reference datum, and
      generate first altitude data based upon the reflection point data and reference point data, where
         the first altitude data is representative of a first measurement of aircraft altitude, and
         the first measurement of aircraft altitude is a measurement of vertical distance between the aircraft and a conventional, fixed reference datum other than an underlying ground surface.

2. The system of claim 1, wherein the fixed surface reference point is a landing threshold point of a runway, the reflection point coincides with the fixed surface reference point, or both.

3. The system of claim 1, wherein the reflection point data is representative of a vertical distance above the reflection point.

4. The system of claim 3, wherein the vertical distance above the reflection point has been determined as a function of an elevation angle and a range to the reflection point as measured by the aircraft radar system.

5. The system of claim 1, wherein the reflection point data is representative of an elevation angle and a range to the reflection point as measured by the aircraft radar system.

6. The system of claim 1, wherein the basis for determining the first measurement data includes elevation offset data.

7. The system of claim 1, further comprising:
   a source of navigation data; and
   a second processor configured to
      receive second altitude data representative of a second measurement of aircraft altitude from the source of navigation data, where
         the second measurement of aircraft altitude is a measurement of vertical distance between the aircraft and a conventional, fixed reference datum other than an underlying ground surface,
      determine the validity of the second altitude data by comparing the first altitude data with the second altitude data, and generate validity advisory data responsive to the validity determination, whereby
the validity advisory data is representative of validity information.

8. The system of claim 7, wherein the first processor and the second processor are the same processor.

9. A system for determining the validity of altitude data, such system comprising:
a source of radar-based aircraft altitude data;
a source of navigation data; and
a first processor configured to
receive first altitude data representative of a first measurement of aircraft altitude from the source of radar-based altitude data other than a radar altimeter system, where
the first measurement of aircraft altitude is a measurement of vertical distance between the aircraft and a conventional, fixed reference datum other than an underlying ground surface,
receive second altitude data representative of a second measurement of aircraft altitude from the source of navigation data, where
the second measurement of aircraft altitude is a measurement of vertical distance between the aircraft and a conventional, fixed reference datum other than an underlying ground surface,
determine the validity of the second altitude data by comparing the first altitude data with the second altitude data, and
generate validity advisory data responsive to the validity determination, whereby
the validity advisory data is representative of validity information.

10. The system of claim 9, wherein the source of radar-based altitude data is a second processor configured to
receive reflection point data corresponding to a reflection point from an aircraft radar system other than a radar altimeter system,
receive reference point data representative of the fixed elevation of a fixed surface reference point, where
the fixed elevation of the fixed surface reference point is a measurement of vertical distance between the surface and a conventional, fixed reference datum,
determine the first measurement of aircraft altitude based upon the reflection point data and reference point data, and
generate altitude data representative of the first measurement of aircraft altitude.

11. The system of claim 10, wherein the first processor and the second processor are the same processor.

12. The system of claim 9, wherein the second altitude data is determined to be valid when the difference between the first measurement of aircraft altitude and the second measurement of aircraft altitude falls within a defined tolerance limit.

13. The system of claim 9, further comprising:
a presentation system configured to
receive the validity advisory data from the first processor, where
such first processor has been further configured to provide such data, and
present the validity information represented in the validity advisory data to the pilot, whereby
such information is presented visually on the screen of a display unit, aurally through an aural alert unit, tactilely through a tactile alert unit, or any combination thereof.

14. A method for generating altitude data, where such method is performed by an aircraft avionics system processor, such method comprising:
receiving reflection point data corresponding to a reflection point from an aircraft radar system other than a radar altimeter system;
receiving reference point data representative of the fixed elevation of a fixed surface reference point from a source of reference point data, where
the fixed elevation of the fixed surface reference point is a measurement of vertical distance between the surface and a conventional, fixed reference datum; and
generating first altitude data based upon the reflection point data and reference point data, where
the first altitude data is representative of a first measurement of aircraft altitude, and
the first measurement of aircraft altitude is a measurement of vertical distance between the aircraft and a conventional, fixed reference datum other than an underlying ground surface.

15. The method of claim 14, wherein the fixed surface reference point is a landing threshold point of a runway, the reflection point coincides with the fixed surface reference point, or both.

16. The method of claim 14, wherein the reflection point data is representative of a vertical distance above the reflection point.

17. The method of claim 16, wherein the vertical distance above the reflection point has been determined as a function of an elevation angle and a range to the reflection point as measured by the aircraft radar system.

18. The method of claim 14, wherein the reflection point data is representative of an elevation angle and a range to the reflection point as measured by the aircraft radar system.

19. The method of claim 14, wherein the basis for determining the first measurement data includes elevation offset data.

20. The method of claim 14, further comprising:
receiving second altitude data representative of a second measurement of aircraft altitude from a source of navigation data, where
the second measurement of aircraft altitude is a measurement of vertical distance between the aircraft and a conventional, fixed reference datum other than an underlying ground surface;
determining the validity of the second altitude data by comparing the first altitude data with the second altitude data; and
generating validity advisory data responsive to the validity determination, whereby
the validity advisory data is representative of validity information.

21. A method for determining the validity of altitude data, where such method is performed by an aircraft avionics system processor, such method comprising:
receiving first altitude data representative of a first measurement of aircraft altitude from a source of radar-based aircraft altitude data other than a radar altimeter system, where
the first measurement of aircraft altitude is a measurement of vertical distance between the aircraft and a conventional, fixed reference datum other than an underlying ground surface;
receiving second altitude data representative of a second measurement of aircraft altitude from a source of navigation data, where the second measurement of aircraft altitude is a measurement of vertical distance between the aircraft and a conventional, fixed reference datum other than an underlying ground surface;

determining the validity of the second altitude data by comparing the first altitude data with the second altitude data; and generating validity advisory data responsive to the validity determination, whereby the validity advisory data is representative of validity information.

22. The method of claim 21, wherein the first altitude data received from a source of radar-based aircraft altitude data other than a radar altimeter system was generated by receiving reflection point data corresponding to a reflection point from an aircraft radar system other than a radar altimeter system, receiving reference point data representative of the fixed elevation of a fixed surface reference point, where the fixed elevation of the fixed surface reference point is a measurement of vertical distance between the surface and a conventional, fixed reference datum;

determining the first measurement of aircraft altitude based upon the reflection point data and reference point data, and generating altitude data representative of the first measurement of aircraft altitude.

23. The method of claim 21, wherein the second altitude data is determined to be valid when the difference between the first measurement of aircraft altitude and the second measurement of aircraft altitude falls within a defined tolerance limit.

24. The method of claim 21, further comprising:

providing the validity advisory data to a presentation system configured to present the validity information represented in the validity advisory data to the pilot, whereby such information is presented visually on the screen of a display unit, aurally through an aural alert unit, tactilely through a tactile alert unit, or any combination thereof.

* * * * *